United States Patent
Tanaka

(10) Patent No.: US 9,760,285 B2
(45) Date of Patent: Sep. 12, 2017

(54) IMAGE PROCESSING SYSTEM AND IMAGE PROCESSING APPARATUS FOR CONFIGURING LOGICAL CIRCUIT ON CIRCUIT ACCORDING TO CONFIGURATION DATA

(71) Applicant: CANON KABUSHIKI KAISHA, Tokyo (JP)

(72) Inventor: Yasutomo Tanaka, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 14/961,531

(22) Filed: Dec. 7, 2015

(65) Prior Publication Data
US 2016/0162193 A1    Jun. 9, 2016

(30) Foreign Application Priority Data

Dec. 9, 2014 (JP) ................................. 2014-249423

(51) Int. Cl.
*H03K 19/177* (2006.01)
*G06F 7/38* (2006.01)
*G06F 3/06* (2006.01)

(52) U.S. Cl.
CPC .......... *G06F 3/0604* (2013.01); *G06F 3/0659* (2013.01); *G06F 3/0673* (2013.01)

(58) Field of Classification Search
CPC ..... G06F 3/0604; G06F 3/0659; G06F 3/0673
USPC ................. 326/38, 40; 358/1.13; 713/2, 100
See application file for complete search history.

(56) References Cited

U.S. PATENT DOCUMENTS

2014/0006766 A1\* 1/2014 Ito ....................... G06F 9/44505
713/2

FOREIGN PATENT DOCUMENTS

JP          2011186981 A      9/2011

\* cited by examiner

*Primary Examiner* — Daniel D Chang
(74) *Attorney, Agent, or Firm* — Canon USA, Inc. IP Division

(57) ABSTRACT

An image processing system includes, a reconfigurable circuit, a storage unit storing first configuration data for a first logical circuit in a predetermined area on the reconfigurable circuit, and second configuration data for a second logical circuit in the predetermined area, and a configuration unit configured to perform first configuration processing for configuring the first logical circuit in the predetermined area, by using the stored first configuration data and predetermined configuration data, on the predetermined area and a different area, and to perform second configuration processing for configuring the second logical circuit in the predetermined area, by using the stored second configuration data and predetermined configuration data, on the predetermined area and the different area. The predetermined configuration data used for the first configuration processing and the predetermined configuration data used for the second configuration processing are not stored in a duplicated way.

14 Claims, 8 Drawing Sheets

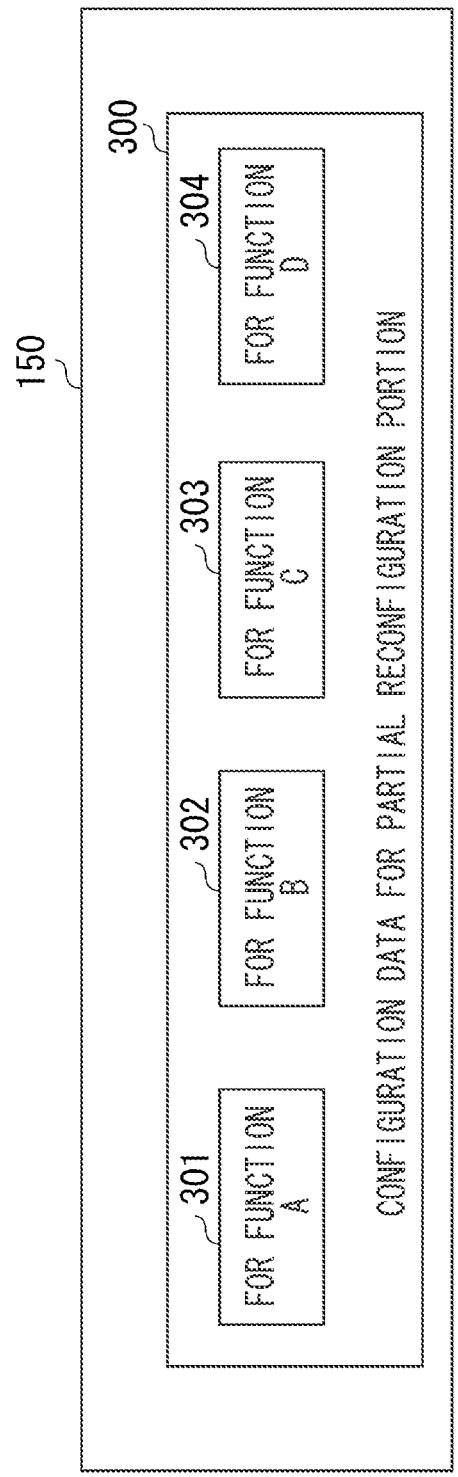

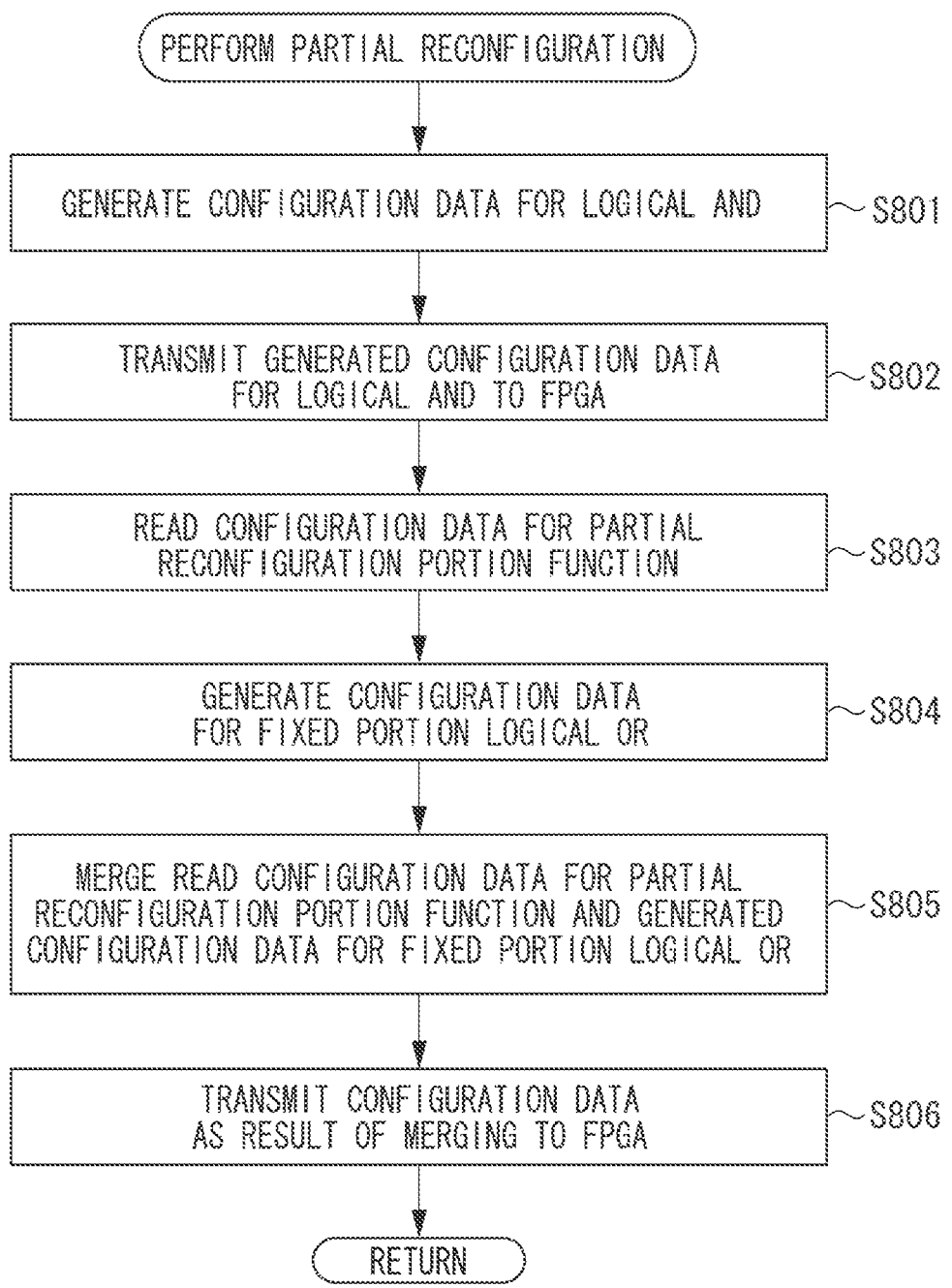

IMAGE PROCESSING SYSTEM AND IMAGE PROCESSING APPARATUS FOR CONFIGURING LOGICAL CIRCUIT ON CIRCUIT ACCORDING TO CONFIGURATION DATA

BACKGROUND OF THE INVENTION

Field of the Invention

One disclosed aspect of the embodiments relates to an image processing apparatus for handling image data, a method for controlling the image processing apparatus, and a program therefor.

Description of the Related Art

Programmable logic devices (PLDs) such as complex programmable logic devices (CPLDs) and field programmable gate arrays (FPGAs) having internal programmable logical circuits are well known. In a PLD, logical circuit configuration information (hereinafter referred to as configuration data) stored in a read only memory (ROM) for configuration is written in a configuration memory which is an internal volatile memory. With this write operation, the operation of each logical block in the PLD is changed to configure a logical circuit. Writing configuration data in a PLD is referred to as configuration.

Recent PLDs are capable of performing partial reconfiguration of logical circuits. More specifically, changing the contents of the configuration data of a certain portion on the configuration memory enables changing only the operation of a logical block included in an area corresponding to the relevant certain portion out of all areas having a plurality of logical blocks included in the PLD. Japanese Patent Application Laid-Open No. 2011-186981 discusses a method for sequentially configuring a plurality of logical circuits configuring a pipeline in different areas in a PLD according to the progress of pipeline processing by using a partial reconfiguration technique.

The configuration data is stored in the ROM for configuration. When implementing a plurality of types of logical circuits, a plurality of types of configuration data is stored in this ROM, and differences between the plurality of types of configuration data stored in the ROM may be small.

In other words, since an identical portion of the configuration data is stored in the ROM in a duplicated way, the memory capacity required for storing the configuration data had increased.

SUMMARY OF THE INVENTION

According to an aspect of the disclosure, an image processing system includes a reconfigurable circuit capable of configuring a logical circuit according to configuration data, a storage unit configured to store first configuration data for configuring a first logical circuit in a predetermined area on the circuit, and second configuration data for configuring a second logical circuit in the predetermined area, and a configuration unit configured to perform first configuration processing for configuring the first logical circuit in the predetermined area, by using the stored first configuration data and predetermined configuration data, on the predetermined area and an area different from the predetermined area, and to perform second configuration processing for configuring the second logical circuit in the predetermined area, by using the stored second configuration data and predetermined configuration data, on the predetermined area and the different area. A logical circuit configured in the different area by the first configuration processing and a logical circuit configured in the different area by the second configuration processing are identical. The predetermined configuration data used for the first configuration processing and the predetermined configuration data used for the second configuration processing are not stored in the storage unit in a duplicated way.

Further features of the disclosure will become apparent from the following description of exemplary embodiments with reference to the attached drawings.

BRIEF DESCRIPTION OF THE DRAWINGS

FIG. 3 illustrates an example of a conventional method for storing configuration data.

FIG. 8 is a flowchart illustrating in detail a processing flow of dynamic partial reconfiguration in an image processing apparatus according to a second exemplary embodiment.

DESCRIPTION OF THE EMBODIMENTS

Exemplary embodiments of the disclosure will be described below.

[Configuration of Image Processing Apparatus]

Figure 1:
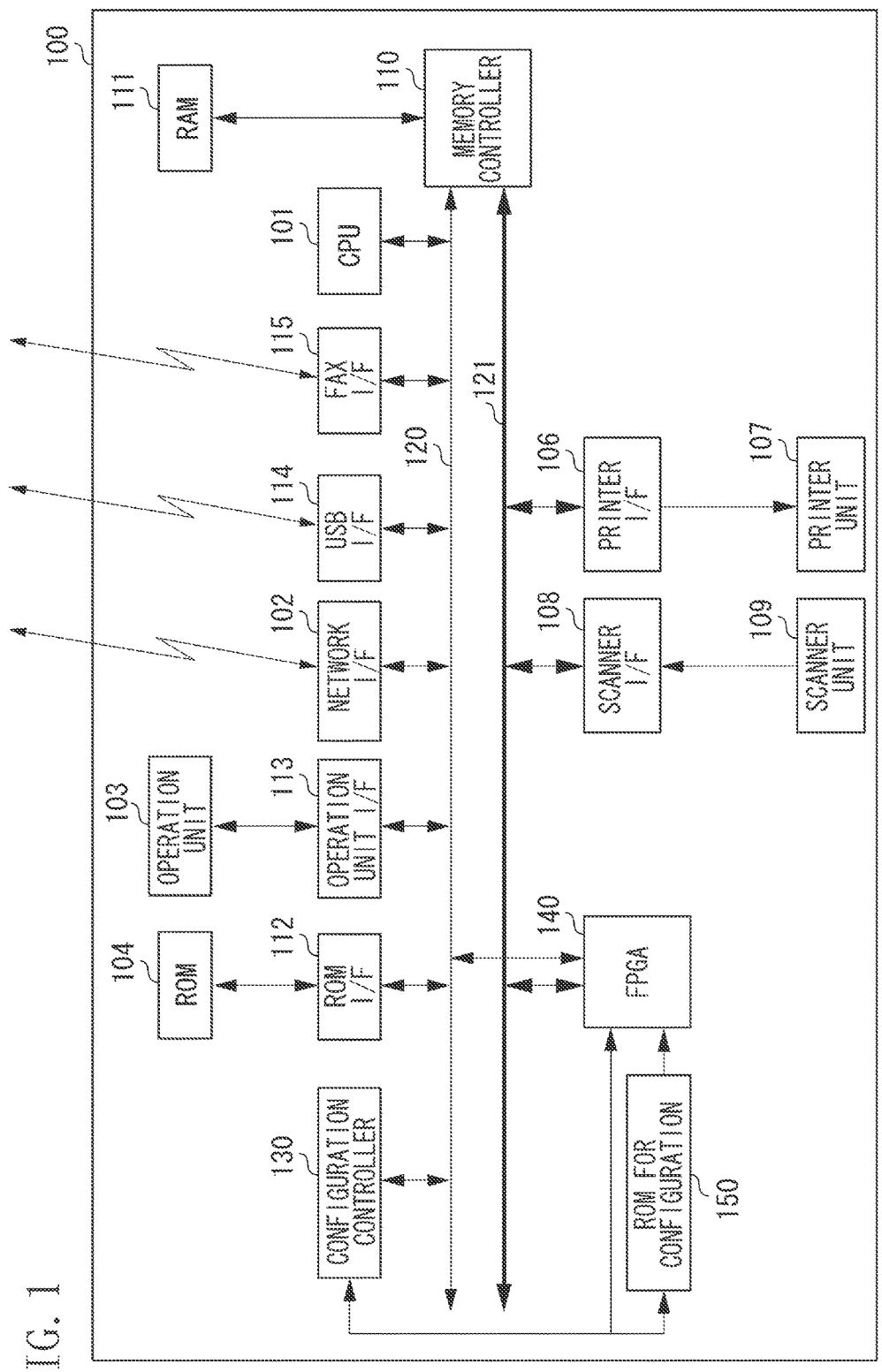
FIG. 1 is a block diagram illustrating an example of a configuration of an image processing apparatus according to a first exemplary embodiment.

A first exemplary embodiment will be described below. FIG. 1 is a block diagram illustrating a hardware configuration of an image processing apparatus (image processing system) according to the present exemplary embodiment. An image processing apparatus 100 according to the present exemplary embodiment includes an operation unit 103 for enabling a user of the image processing apparatus 100 to perform various operations, a scanner unit 109 for reading image information according to an instruction from the operation unit 103, and a printer unit 107 for printing image data on paper. A scanner unit 109 includes a central processing unit (CPU) (not illustrated) for controlling the scanner unit 109, and an illumination lamp, a scanning mirror, etc. (not illustrated) for reading a document. The printer unit 107 includes a CPU (not illustrated) for controlling the printer unit 107, and photosensitive drums and a fixing unit (not illustrated) for performing image forming and fixing, respectively.

The image processing apparatus 100 includes a CPU 101 for totally controlling operations of the image processing apparatus 100 by executing control software for controlling each unit of image processing apparatus 100. The image processing apparatus 100 further includes a read only memory (ROM) 104 storing programs to be executed by the CPU 101. The image processing apparatus 100 further includes a random access memory (RAM) 111 which serves as a system work memory used by the CPU 101 to operate and also as an image memory for temporarily storing image data. The image processing apparatus 100 further includes a memory controller 110 for controlling write and read operations for the RAM 111. The memory controller 110 is connected to a system bus 120 and an image bus 121, and controls access to the RAM 111.

The image processing apparatus 100 further includes an FPGA 140 as a programmable logic device having a reconfigurable circuit capable of configuring a logical circuit. Although, in the present exemplary embodiment, the FPGA 140 will be described below as a programmable logic device, a device having a circuit capable of configuring a logical circuit may be used as a programmable logic device. The FPGA 140 according to the present exemplary embodiment is a device capable of performing partial reconfiguration.

The image processing apparatus 100 further includes a configuration controller 130 and a ROM for configuration 150. The configuration controller 130 acquires configuration data from the ROM for configuration 150 and writes the configuration data in the configuration memory of the FPGA 140, under control of the CPU 101. The FPGA 140 configures a logical circuit by setting operations of an internal logical block according to the written configuration data. Configuring a logical circuit by writing configuration data is referred to as configuration. More specifically, the FPGA 140 includes a circuit capable of configuring a logical circuit according to the configuration data.

The image processing apparatus 100 further includes a scanner interface (I/F) 108 for inputting image data from the scanner unit 109, and a printer I/F 106 for outputting image data to the printer unit 107. The FPGA 140, the scanner I/F 108, and the printer I/F 106 are connected to the image bus 121 for transmitting image data to be processed.

The image processing apparatus 100 communicates with (transmits and receives data to/from) a general-purpose computer (not illustrated) on a network via a network I/F 102. The image processing apparatus 100 further communicates with (transmits and receives data to/from) a general purpose computer (not illustrated) connected with the image processing apparatus 100 via a universal serial bus (USB) I/F 114. The image processing apparatus 100 connects with a public line network and further communicates with (transmits and receives data to/from) other image processing apparatus and a facsimile machine (not illustrated), via a FAX (facsimile) I/F 115. The image processing apparatus 100 includes a ROM I/F 112 for controlling programs to be executed by the CPU 101, and read and write operations on the ROM 104. The image processing apparatus 100 further includes the system bus 120 for mutually connecting the CPU 101, the network I/F 102, the operation unit 103, the ROM I/F 112, the configuration controller 130, and the FPGA 140. The CPU 101 performs parameter setting on logical circuits of the FPGA 140 and parameter setting on the scanner I/F 108 and the printer I/F 106, via the system bus 120.

[Configuration for Partial Reconfiguration]

Figure 2:
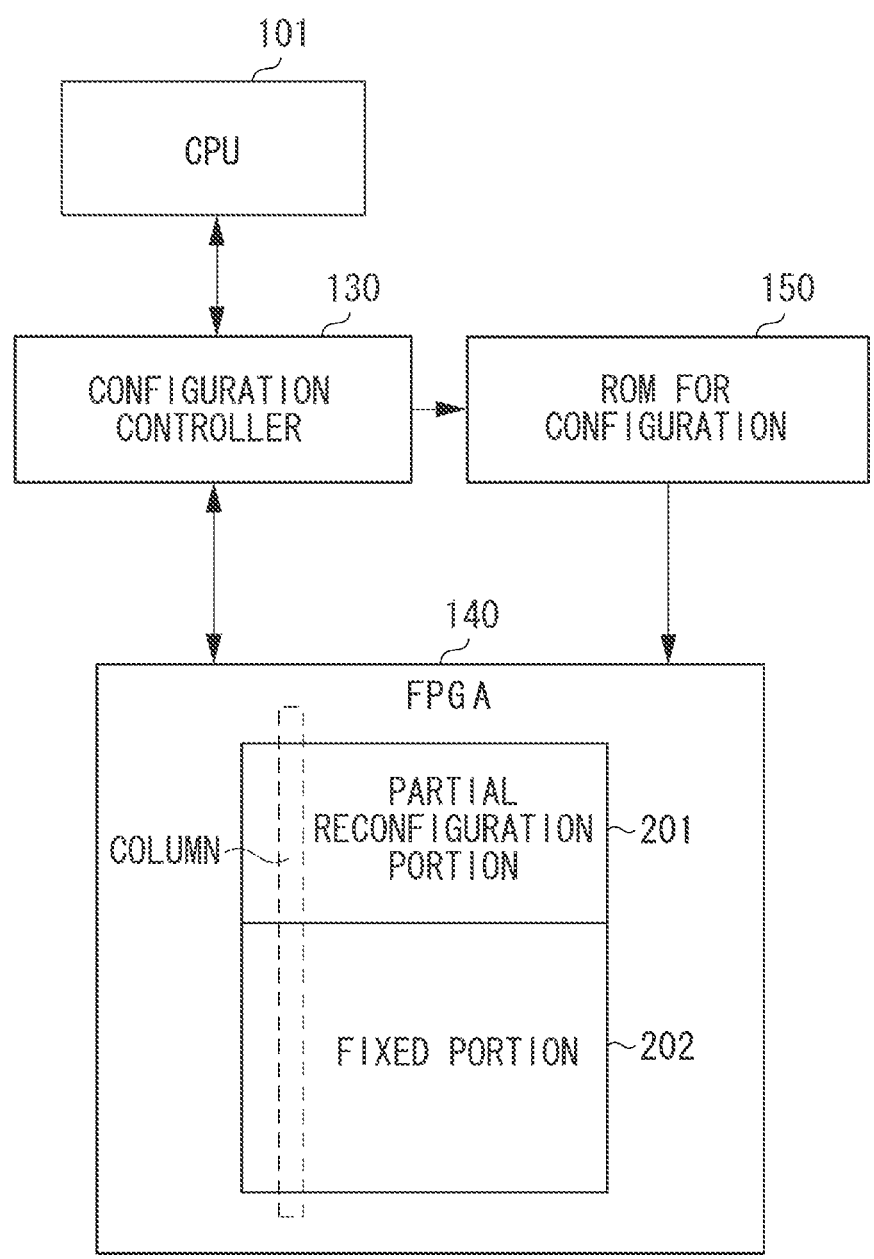
FIG. 2 is a block diagram illustrating a configuration related to dynamic partial reconfiguration in the image processing apparatus according to the first exemplary embodiment.

Partial reconfiguration in the image processing apparatus 100 according to the present exemplary embodiment will be described below with reference to FIG. 2. FIG. 2 is a block diagram illustrating a configuration for partial reconfiguration in the image processing apparatus 100.

The CPU 101, the configuration controller 130, the ROM for configuration 150, and the FPGA 140 are as described above with reference to FIG. 1.

The FPGA 140 includes an area having a plurality of logical blocks. In the FPGA 140 capable of performing partial reconfiguration, this area can be divided into a plurality of portions, and a logical circuit can be individually changed for each division portion. Referring to FIG. 2, the respective division portions are referred to as a partial reconfiguration portion 201 and a fixed portion 202. When performing partial reconfiguration on a logical circuit in the partial reconfiguration portion 201, the operation of a logical block included in the fixed portion 202 remains unchanged (fixed). The partial reconfiguration portion 201 and the fixed portion 202 are arranged on the same column. This means that, when performing partial reconfiguration on a logical circuit in the partial reconfiguration portion 201, writing is performed not only on the partial reconfiguration portion 201 but also on the configuration memory corresponding to the fixed portion 202, as described below.

The configuration controller 130 has a function of managing partial reconfiguration for each partial reconfiguration portion 201. For example, upon reception of an instruction for executing configuration on the partial reconfiguration portion 201 from the CPU 101, the configuration controller 130 reads the configuration data for changing the logical circuit of the partial reconfiguration portion 201 from the ROM for configuration 150. Then, the configuration controller 130 transmits the read configuration data to the FPGA 140. The FPGA 140 writes the transmitted configuration data in the corresponding portion of the configuration memory to configure a logical circuit in the partial reconfiguration portion 201. Configuration procedures will be described in detail below with reference to FIGS. 4A to 7.

A conventional method for storing the configuration data of a logical circuit configured in the partial reconfiguration portion 201 of the FPGA 140 will be described below with reference to FIG. 3.

FIG. 3 illustrates an example of configuration data corresponding to the partial reconfiguration portion 201 of the FPGA 140 stored in the ROM for configuration 150. In this example, the partial reconfiguration portion 201 stores the configuration data 300 for the partial reconfiguration portion 201 (the configuration data for function A 301 to the configuration data for function D 304) for configuring logical circuits for functions A to D.

Storing the configuration data 300 for partial reconfiguration portion 201 in the ROM for configuration 150 for each function in this way enables configuring logical circuits having various functions in the partial reconfiguration portion 201. However, with the increase in the number of functions, the total amount of configuration data stored in the ROM for configuration 150 increases.

<Descriptions of Configuration of Configuration Data for Partial Reconfiguration>

Figure 4A:
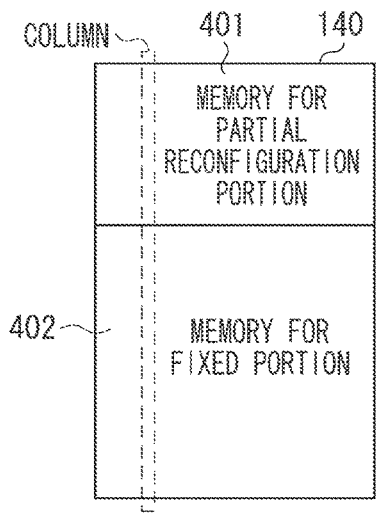
FIGS. 4A and 4B illustrate in detail a configuration data structure for reconfiguring a partial reconfiguration portion in the image processing apparatus according to the first exemplary embodiment.

Configuration based on configuration data for a specific function (for example, the above-described function A) will be described below with reference to FIGS. 4A and 4B and subsequent drawings.

An example design of the partial reconfiguration portion of the FPGA 140 will be described below with reference to FIG. 4A. FIG. 4A is a conceptual view illustrating the configuration memory in the FPGA 140 according to the present exemplary embodiment. Generally, when performing partial reconfiguration on the FPGA, a designer determines which portion of the configuration memory inside the FPGA corresponds to the partial reconfiguration portion. "A certain portion of the configuration memory corresponds to the partial reconfiguration portion" means a relation that rewriting configuration data written in the relevant portion changes the operation of the logical block included in the relevant partial reconfiguration portion. More specifically, only the logical circuit of the partial reconfiguration portion is changed. In the example illustrated in FIG. 4A, the portion of the configuration memory rewritten to change the operation of the logical block included in the partial reconfiguration portion 201 is referred to as a memory for partial reconfiguration portion 401. On the other hand, a memory for fixed portion 402 illustrated in FIG. 4A refers to a portion of the configuration memory which is rewritten when changing the operation of the logical block included in the fixed portion 202.

The following descriptions assume performing partial reconfiguration of a desired logical circuit in the partial reconfiguration portion 201. More specifically, the contents of the logical circuit configured in the fixed portion 202 remain unchanged.

<Procedures of Configuration Processing>

Procedures for configuration processing in partial reconfiguration will be described below. In the FPGA, configuration data is written in the configuration memory not in free units but in minimum writing units. For example, schematically speaking, some FPGA devices have a minimum rewriting unit of one column prolonging from the top to the bottom of the configuration memory, and other FPGA devices have a minimum rewriting unit of one row or a square area having a specific size. More specifically, when partially configuring a logical circuit in the partial reconfiguration portion 201, it may be necessary to write configuration data not only in the memory for partial reconfiguration portion 401 but also in the memory for fixed portion 402.

For example, the configuration memory of the FPGA 140 according to the present exemplary embodiment has a minimum writing unit of one column. Therefore, when configuring a logical circuit in the partial reconfiguration portion 201, the memory for fixed portion 402 located on the same column as the memory for partial reconfiguration portion 401 is also subjected to configuration data writing (a configuration data writing target). Therefore, such configuration data for the memory for fixed portion 402 that does not change the contents of the logical circuit configured in the fixed portion 202 is required.

Conventionally, configuration data that does not change the contents of the logical circuit of the fixed portion 202 and configuration data for a logical circuit having a function to be configured in the partial reconfiguration portion 201 are collectively used as the configuration data 300 for the partial reconfiguration portion 201. More specifically, the configuration data for function A 301 includes configuration data that does not change the contents of the logical circuit of the fixed portion 202, and configuration data of a logical circuit having the function A to be configured in the partial reconfiguration portion 201. This also applies to configuration data 302 to 304 for functions B to D. Therefore, in the configuration data 300 for the partial reconfiguration portion 201 (refer to FIG. 3), some data contents in the configuration data for function A 301 to the configuration data for function D 304 are duplicated. For example, "configuration data that does not change the contents of the logical circuit of the fixed portion 202" is duplicated. More specifically, when there is a plurality of functions A to D, the ROM for configuration 150 conventionally stores configuration data having completely the same contents in a duplicated way. This is one of causes of the decrease in the capacity of the ROM for configuration 150.

<Detailed Procedures of Configuration Processing>

Configuration for configuring a logical circuit (a specific logical circuit) having a specific function in the partial reconfiguration portion 201 will be described in detail below with reference to FIG. 4B. The minimum writing unit of the configuration memory for performing partial reconfiguration is a column.

Figure 4B:
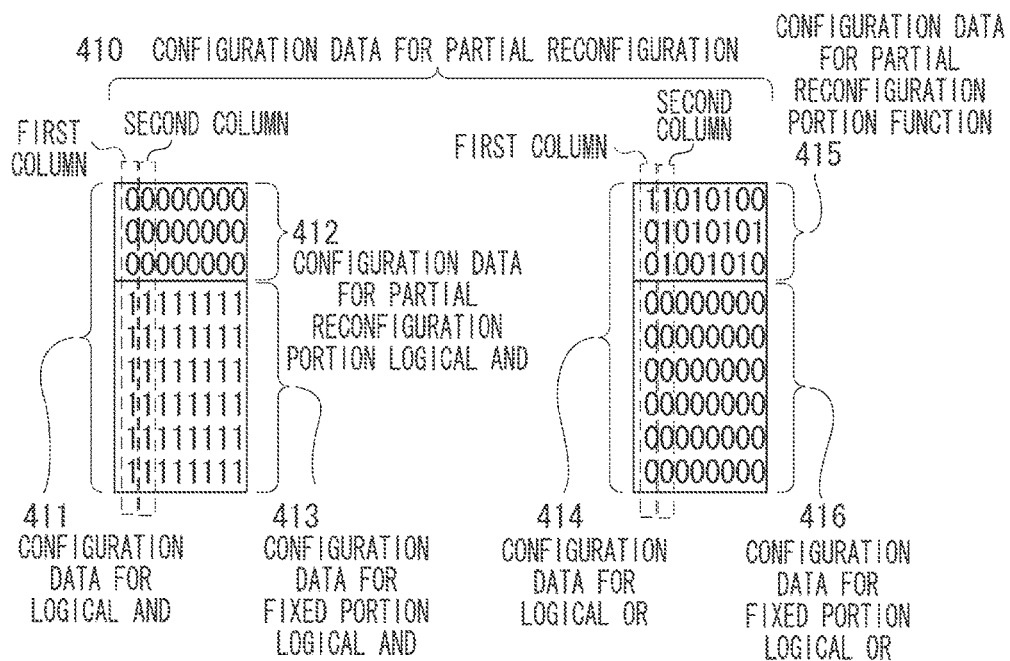

Configuration data for partial reconfiguration 410 illustrated in FIG. 4B is, for example, the configuration data for function A 301 in the configuration data 300 for the partial reconfiguration portion 201 illustrated in FIG. 3. The configuration data for partial reconfiguration 410 includes configuration data for logical AND 411 and configuration data for logical OR 414. Configuration refer to acquiring the following processing results (1) and (2). (1) Firstly, configuration data currently written in the memory for partial reconfiguration portion 401 is cleared to "0." (2) Secondly, configuration data for configuring a specific logical circuit is written in the memory for partial reconfiguration portion 401. However, note that the writing of configuration data at the time of configuration is performed only in column units.

More specifically, the configuration controller 130 transmits to the FPGA 140 the configuration data for logical AND 411 for clearing the configuration data currently written in the memory for partial reconfiguration portion 401 to "0." In this case, the configuration controller 130 transmits the configuration data for logical AND 411 illustrated in FIG. 4B in order of data to be written in the first column, data to be written in the second column, and so on in the configuration memory. More specifically, the configuration data is transmitted in column units. In more detail, data to be written in one column is transmitted in order from the top downward in the column. Therefore, in the example illustrated in FIG. 4B, configuration data for partial reconfiguration portion logical AND 412 and configuration data for fixed portion logical AND 413 are alternately transmitted. This transmission includes an instruction for updating the configuration data currently written in the memory for partial reconfiguration portion 401 and the memory for fixed portion 402 in the FPGA 140 with the results of the respective logical AND operations with the configuration data for logical AND 411.

The configuration data for logical AND 411 includes the configuration data for partial reconfiguration portion logical AND 412 and the configuration data for fixed portion logical AND 413. The configuration data for partial reconfiguration portion logical AND 412 consists of bit stream data of all "0s." The configuration data for fixed portion logical AND 413 consists of bit stream data of all "1s". Therefore, although updating is performed in column units of the configuration memory, the writing on the configuration data for fixed portion logical AND 413 is performed without changing the contents of the configuration data currently written in the memory for fixed portion 402.

Then, the configuration controller 130 transmits to the FPGA 140 the configuration data for logical OR 414 for configuring a logical circuit for the function A in the memory for partial reconfiguration portion 401. In this case, the configuration controller 130 transmits the configuration data for logical OR 414 illustrated in FIG. 4B in order of data to be written in the first column, data to be written in the second column, and so on in the configuration memory. More specifically, also in this case, configuration data is transmitted in column units. As described above, data to be written in one column is also transmitted in order from the top downward in the column. Therefore, in the example illustrated in FIG. 4B, configuration data for partial reconfiguration portion function 415 and configuration data for fixed portion logical OR 416 are alternately transmitted. This transmission includes an instruction for updating the configuration data currently written in the memory for partial reconfiguration portion 401 and the memory for fixed portion 402 in the FPGA 140, which has already been updated through logical AND, with the results of the respective logical OR operations with the configuration data for logical OR 414.

The configuration data for logical OR 414 includes the configuration data for partial reconfiguration portion function 415 and the configuration data for fixed portion logical OR 416. The configuration data for partial reconfiguration portion function 415 consists of bit stream data corresponding to the logical circuit of a specific function (for example, the function A). The configuration data for fixed portion logical OR 416 consist of bit stream data of all "0s." Therefore, although updating is performed in column units of the configuration memory, the writing on the configuration data for fixed portion logical OR 416 is performed without changing the contents of the memory for fixed portion 402.

As described above, the configuration controller 130 writes the configuration data for partial reconfiguration 410 (for example, the configuration data for function A 301) in the memory for partial reconfiguration portion 401 and the memory for fixed portion 402 in column units.

A point which should be noted here is that bit stream data pieces having the same contents are conventionally stored in a duplicated manner in the ROM for configuration 150 as separate configuration data pieces for configuring logical circuits having different functions in the partial reconfiguration portion 201. More specifically, the configuration data for logical AND 411 and the configuration data for fixed portion logical OR 416 having the same contents are duplicated between different configuration data pieces. The following describes a method for storing configuration data commonly usable while avoiding wasteful duplication. Although the present exemplary embodiment is on the premise that the minimum writing unit of an FPGA device is a column, the disclosure is not limited thereto. More specifically, configuration data for common use is stored in different ways according to the minimum writing unit of an FPGA device differs.

<Configuration Data Stored in ROM for Configuration>

Configuration data to be stored in the ROM for configuration 150 according to the present exemplary embodiment will be described below with reference to FIG. 5.

Figure 5:
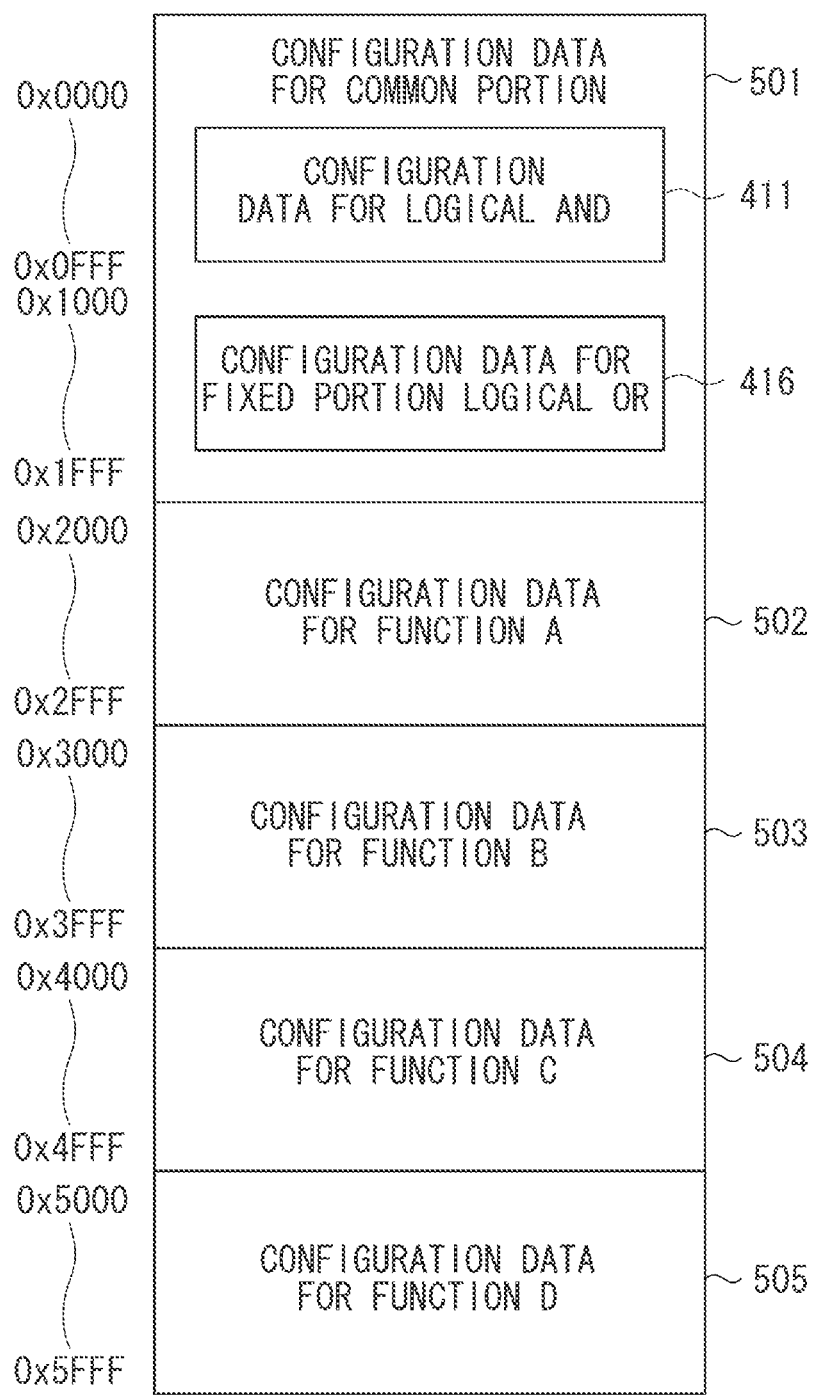
FIG. 5 illustrates an example of a method for storing configuration data in the image processing apparatus according to the first exemplary embodiment.

FIG. 5 illustrates the configuration data to be stored in the ROM for configuration 150 according to the present exemplary embodiment. The ROM for configuration 150 according to the present exemplary embodiment includes configuration data for common portion 501, configuration data for function A 502, configuration data for function B 503, configuration data for function C 504, and configuration data for function D 505. The configuration data for common portion 501 corresponds to the configuration data for logical AND 411 and the configuration data for fixed portion logical OR 416 illustrated in FIG. 4B. The configuration data for function A 502 to the configuration data for function D 505 correspond to the configuration data for partial reconfiguration portion function 415 illustrated in FIG. 4B.

The present exemplary embodiment is characterized in that the configuration data for common portion 501 is used in combination with the configuration data for function A 502 to the configuration data for function D 505. When configuring a logical circuit for each function in the partial reconfiguration portion 201, the configuration data for common portion 501 is repetitively used for column-based configuration processing for each function. Thus, providing the configuration data for common portion 501 enables avoiding data duplication in the configuration data for function A 502 to the configuration data for function D 505, thus reducing the total amount of configuration data compared with the conventional method.

Each piece of configuration data will be described in detail below.

The configuration data for common portion 501 is stored, for example, in addresses 0x0000 to 0x1FFF in the ROM for configuration 150. The configuration data for common portion 501 includes the configuration data for logical AND 411 and the configuration data for fixed portion logical OR 416 illustrated in FIG. 4B. The configuration data for logical AND 411 is stored in addresses 0x0000 to 0x0FFF. The configuration data for fixed portion logical OR 416 is stored in addresses 0x1000 to 0x1FFF. In the present exemplary embodiment, both the configuration data for logical AND 411 and the configuration data for fixed portion logical OR 416 are arranged and stored in order of columns of the writing target configuration memory. For example, bit stream data corresponding to the first column is stored, for example, in addresses 0x0000 to 0x007F, and bit stream data corresponding to the second column is stored, for example, in addresses 0x0080 to 0x00FF. How the configuration data for common portion 501 is used for the configuration memory will be described below.

The configuration data for function A 502 is bit stream data corresponding to the logical circuit for function A which is stored, for example, in addresses 0x2000 to 0x2FFF in the ROM for configuration 150. The configuration data for function A 502 corresponds to the configuration data for partial reconfiguration portion function 415 illustrated in FIG. 4B. The bit stream data corresponding to the logical circuit for function A is also arranged and stored in order of columns of the writing target configuration memory.

Similarly, the configuration data for function B 503, the configuration data for function C 504, and the configuration data for function D 505 are also stored in the ROM for configuration 150. The configuration data 503, 504, and 505 also correspond to the configuration data for partial reconfiguration portion function 415 illustrated in FIG. 4B.

<Configuration Processing Flow>

Figure 6:
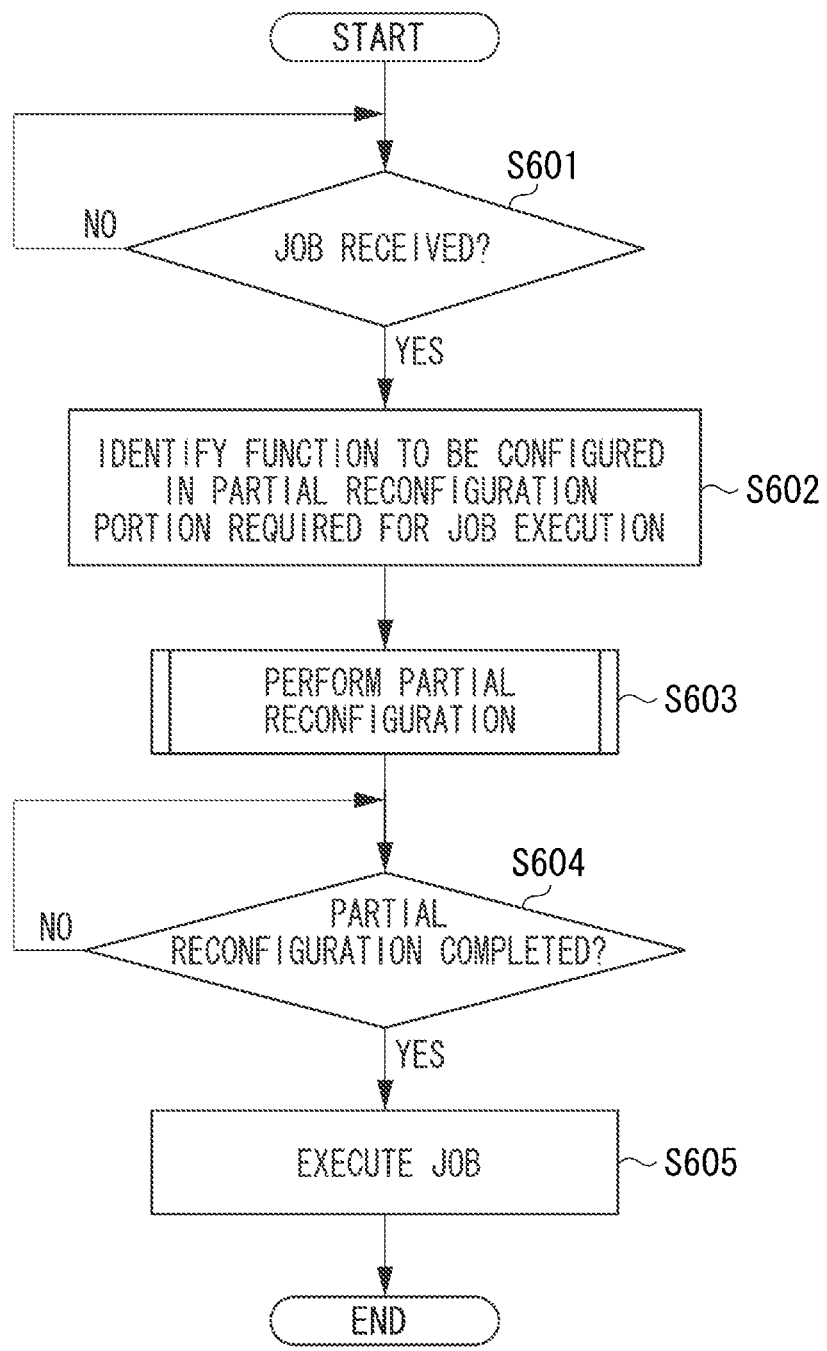
FIG. 6 is a flowchart illustrating job execution processing control in the image processing apparatus according to the first exemplary embodiment.

FIG. 6 is a flowchart illustrating job execution processing control of the image processing apparatus according to the present exemplary embodiment. Each step in the flowchart illustrated in FIG. 6 is implemented when the CPU 101 executes a program stored in the ROM 104. More specifically, the CPU 101 under program execution controls the configuration controller 103. In the following processing, a logical circuit is considered to be configured in the partial reconfiguration portion 201.

In step S601, the CPU 101 waits for a job to be executed. More specifically, the CPU 101 determines whether a job has been received. When a job has been received (YES in step S601), the processing proceeds to step S602.

In step S602, when executing the job received in step S601, the CPU 101 identifies a logical circuit (function) to be configured in the partial reconfiguration portion 201 of the FPGA 140 according to the processing contents of the received job. For example, when the processing contents of the received job requires the function A, the CPU 101 identifies a logical circuit for function A as a logical circuit to be configured in the configuration memory. In this case, for example, a logical circuit having another function is configured in the fixed portion 202, and data processing is being executed.

In step S603, the CPU 101 controls the configuration controller 130 to configure the logical circuit identified in step S602 in the partial reconfiguration portion 201. This processing will be described in detail below with reference to FIG. 7.

In step S604, the CPU 101 determines whether the configuration processing is completed. This determination will be described in detail below. The configuration controller 130 receives an end signal indicating the completion of the configuration processing from the FPGA 140. Then, the configuration controller 130 notifies the CPU 101 of the reception of the end signal. Upon reception of the notification, the CPU 101 determines that the configuration processing is completed. When the CPU 101 determines that the configuration processing is completed (YES in step S604), the processing proceeds to step S605. On the other hand, when the CPU 101 determines that the configuration processing is not completed (NO in step S604), the processing waits in step S604 (until the configuration controller 130 receives the configuration end signal from the FPGA 140).

In step S605, the CPU 101 performs data processing of the received job by using the logical circuit configured on the configuration memory through the configuration processing in step S603.

This completes descriptions of procedures for executing the received job.

Figure 7:
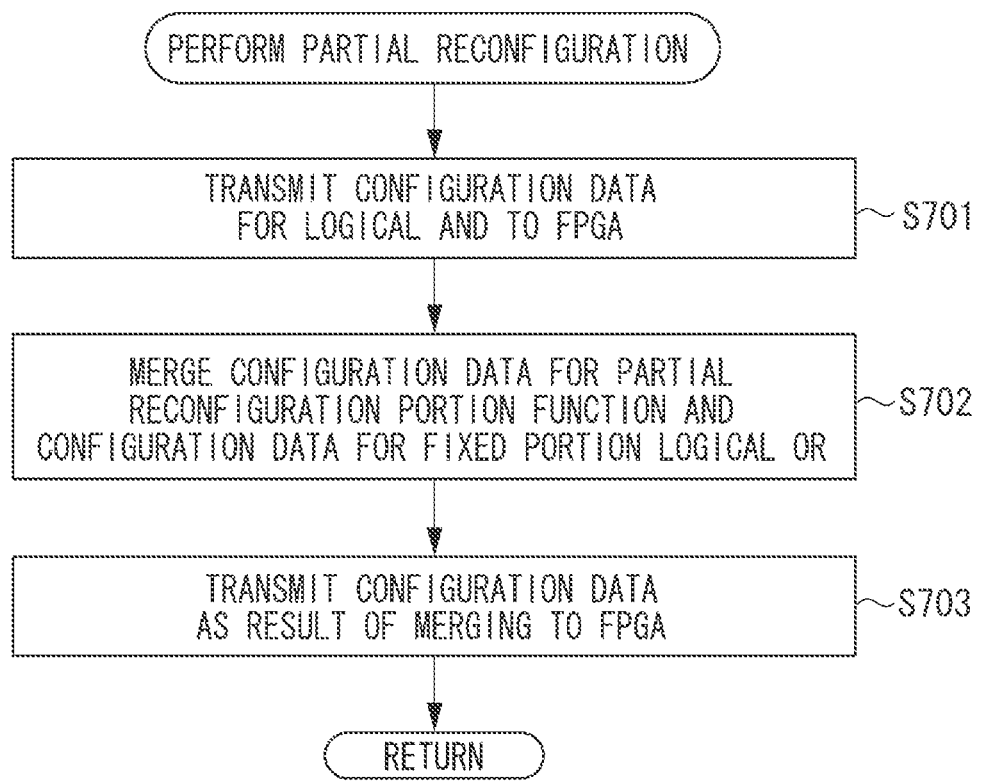
FIG. 7 is a flowchart illustrating in detail a processing flow of dynamic partial reconfiguration in the image processing apparatus according to the first exemplary embodiment.

A flowchart illustrating in detail the configuration processing performed in step S603 will be described below with reference to FIG. 7. Each step in the flowchart illustrated in FIG. 7 is performed by the CPU 101 and the configuration controller 130 under control of the CPU 101. In this case, a logical circuit will be configured in the partial reconfiguration portion 201.

In step S701, the CPU 101 instructs the configuration controller 130 to perform the following processing (1) and (2).

Processing (1): The configuration controller 130 reads and acquires the configuration data for logical AND 411 stored in addresses 0x0000 to 0x0FFF in the ROM for configuration 150 illustrated in FIG. 5.

Processing (2): The configuration controller 130 transmits the acquired configuration data for logical AND 411 to the FPGA 140 in column units. In this transmission, the configuration controller 130 instructs the FPGA 140 to perform the following processing. The FPGA 140 performs the logical AND operation between the configuration data for logical AND 411 and the configuration data already written in the configuration memory of the FPGA 140. Then, the FPGA 140 writes the result of the relevant operation back in the configuration memory.

As described above with reference to FIG. 4B, the FPGA 140 writes data in column units in the memory for partial reconfiguration portion 401 and the memory for fixed portion 402 by using the configuration data for logical AND 411.

The processing in step S701 is not limited thereto. For example, the configuration controller 130 may reads the configuration data (bit stream data) from address 0x0000 in the ROM for configuration 150, and sequentially transmit the configuration data to the FPGA 140.

In step S702, the CPU 101 instructs the configuration controller 130 to perform the following processing (1), (2), and (3).

Processing (1): The configuration controller 130 reads from the ROM for configuration 150 the configuration data (the configuration data for partial reconfiguration portion function 415) used to configure the logical circuit identified in step S602. For example, in the case of the logical circuit for function A, the configuration controller 130 reads the configuration data for function A from addresses 0x2000 to 0x2FFF in the ROM for configuration 150.

Processing (2): The configuration controller 130 reads and acquires the configuration data for fixed portion logical OR 416 stored in addresses 0x1000 to 0x1FFF in the ROM for configuration 150 illustrated in FIG. 5.

Processing (3): The configuration controller 130 merges two different pieces of the read configuration data. This merging is intended to enable writing the configuration data as a result of merging in the configuration memory in column units, i.e., processing for rearranging the bit stream data configuring two different pieces of the configuration data. Further, this merging is performed according to the position in the memory for partial reconfiguration portion 401 in the configuration memory. More specifically, the configuration data acquired by the merging is bit stream data for changing the contents of the configuration data currently written in the memory for partial reconfiguration portion 401.

For example, referring to FIG. 4B, bit stream data "100" in the first column of the configuration data for partial reconfiguration portion function 415 is merged with bit stream data "000000" in the first column of the configuration data for fixed portion logical OR 416. Since the position of the memory for partial reconfiguration portion 401 is in the upper portion of the column, the bit stream data "100" is arranged in the upper portion of the column and the bit stream data "000000" is arranged in the following portion as a result of this merging. After the merging, bit stream data "100000000" corresponds to the first column.

If the position of the memory for partial reconfiguration portion 401 is in the middle portion of the column, the bit stream data "000000" in the first column of the configuration data for fixed portion logical OR 416 is divided into the upper and lower halves of the column, and the bit stream data "100" is arranged in the middle portion. This means that, after the merging, the bit stream data becomes "000100000."

This also applies to the second column. More specifically, bit stream data "111" in the second column of the configuration data for partial reconfiguration portion function 415 is merged with bit stream data "000000" in the second column of the configuration data for fixed portion logical OR 416. Then, bit stream data "111000000" after the merging corresponding to the second column is rearranged after the bit stream data "100000000" after the merging, corresponding to the first column, already acquired. More specifically, bit stream data "100000000111000000" is acquired.

The above-described merge processing may be performed by using a memory (not illustrated) in the configuration controller 130 or by using the RAM 111.

In step S703, the CPU 101 instructs the configuration controller 130 to perform the following processing. The configuration controller 130 transmits to the FPGA 140 the configuration data (for example, "100000000111000000 . . . ") acquired by the merging in step S702. In this transmission, the configuration controller 130 instructs the FPGA 140 to perform the following processing. The FPGA 140 performs the logical OR operation between the configuration data acquired by the merging and the configuration data written in the configuration memory after the processing in step S701. Then, the FPGA 140 writes the result of the relevant operation back in the configuration memory. As described with reference to FIG. 4B, the FPGA 140 writes data in column units in the memory for partial reconfiguration portion 401 and the memory for fixed portion 402 by using the configuration data for partial reconfiguration portion function 415 and the configuration data for fixed portion logical OR 416.

Upon completion of the processing in step S703, the processing proceeds to step S604 illustrated in FIG. 6. The configuration processing is performed in this way. More specifically, the logical circuit configured in the fixed portion 202 after the configuration processing is identical regardless of the logical circuit (for example, the logical circuit for function A, the logical circuit for function B, etc.) configured in the partial reconfiguration portion 201.

In steps S702 and S703, the CPU 101 may operate as follows. The CPU 101 instructs the configuration controller 130 to acquire two different pieces of configuration data and transmit the relevant configuration data to the CPU 101. Then, the CPU 101 merges two different pieces of the transmitted configuration data into data in column units, as described above. Then, the CPU 101 instructs the configuration controller 130 to write the relevant data after the merging in the FPGA 140.

In steps S702 and S703, alternatively, the CPU 101 may instruct the configuration controller 130 to perform the following processing. The configuration controller 130 performs the following processing to write the configuration data in column units. The configuration controller 130 performs processing for alternately reading a part of the configuration data for functions A to D and a part of the configuration data for fixed portion logical OR 416 from the ROM for configuration 150. Then, the configuration controller 130 sequentially transmits the configuration data to the FPGA 140 in order of reading.

This sequential transmission will be described below with reference to FIG. 4B. (1') Firstly, the configuration controller 130 reads data "100" corresponding to the first column of the configuration data for partial reconfiguration portion function 415, from the ROM for configuration 150, and transmits the data to the FPGA 150. (2') Secondly, the configuration controller 130 reads data "000000" corresponding to the first column of the configuration data for fixed portion logical OR 416, from the ROM for configuration 150, and transmits the data to the FPGA 150. (3') The configuration controller 130 reads data "111" corresponding to the second column of the configuration data for partial reconfiguration portion function 415, from the ROM for configuration 150, and transmits the data to the FPGA 150. (4') The configuration controller 130 reads data "000000" corresponding to the second column of the configuration data for fixed portion logical OR 416, from the ROM for configuration 150, and transmits the data to the FPGA 150. The above-described reading and transmission are alternately repeated for each column.

Performing merge control on the configuration data described with reference to FIG. 7 enables repetitively using common configuration data when configuring logical circuits having a plurality of functions. In this case, only one piece of common configuration data which is repetitively usable needs to be stored in the ROM for configuration 150. Accordingly, the total amount of configuration data to be stored can be reduced, of course, without degrading the flexible writing performance of the logical circuit.

A second exemplary embodiment will be described below. In the above-described first exemplary embodiment, the configuration data for common portion 501 is stored in the ROM for configuration 150. In the present exemplary embodiment, when performing configuration processing, the configuration data for common portion 501 is dynamically generated without storing the configuration data for common portion 501 in the ROM for configuration 150.

The image processing apparatus (image processing system) 100 according to the present exemplary embodiment is almost similar to the image processing apparatus 100 according to the first exemplary embodiment illustrated in FIGS. 1 and 2. The present exemplary embodiment differs from the first exemplary embodiment in that the configuration data for common portion 501 is not stored in the ROM for configuration 150 and that the configuration controller 130 generates the configuration data for partial reconfiguration. More specifically, the configuration controller 130 generates bit stream data corresponding to the configuration data for logical AND 411 and the configuration data for logical OR 414 illustrated in FIG. 4B.

A processing flow performed by the image processing apparatus 100 according to the present exemplary embodiment is similar to that illustrated in FIG. 6. The processing flow according to the present exemplary embodiment differs from the processing flow according to the first exemplary embodiment in that the processing performed in step S603 is processing in the flowchart illustrated in FIG. 8.

The processing in the flowchart illustrated in FIG. 8 is implemented when the CPU 101 executes a program stored in the ROM 104 to control the configuration controller 130. For convenience of descriptions, the following descriptions will be made based on the partial reconfiguration target areas and the configuration data for partial reconfiguration illustrated in FIGS. 4A and 4B, respectively.

In step S801, the CPU 101 instructs the configuration controller 130 to perform the following processing. The configuration controller 130 generates the configuration data for logical AND 411 illustrated in FIG. 4B in order of columns of the configuration memory. The configuration data generation in order of columns is performed as follows. (1) Firstly, the configuration controller 130 references the position of the partial reconfiguration target area in the configuration memory. For example, referring to FIG. 4A, the configuration controller 130 confirms that the position of the memory for partial reconfiguration portion 401 is the upper left position of the configuration memory. (2) Secondly, the configuration controller 130 generates bit stream data in column units so that data "0" is to be written at the referenced position in the configuration memory. For example, referring to FIG. 4B, the configuration controller 130 generates bit stream data "000111111" for the first column of the configuration memory. Then, the configuration controller 130 generates bit stream data "000111111" for the second column. This also applies to the subsequent columns. Bit stream data corresponding to all columns related to the partial configuration target area corresponds to the configuration data for logical AND 411 illustrated in FIG. 4B.

In step S802, the CPU 101 instructs the configuration controller 130 to perform the following processing. The configuration controller 130 performs the processing (for transmitting the generated configuration data for logical AND 411) described in the processing (2) in step S701 illustrated in FIG. 7.

In step S803, the CPU 101 instructs the configuration controller 130 to perform the following processing. The configuration controller 130 performs the processing (for reading the configuration data for partial reconfiguration portion function 415) described in the processing (1) in step S702 illustrated in FIG. 7.

In step S804, the CPU 101 instructs the configuration controller 130 to perform the following processing. The configuration controller 130 generates the configuration data for fixed portion logical OR 416 illustrated in FIG. 4B in order of columns of the configuration memory. This configuration data in order of columns is bit-stream data having "0" as all elements.

In step S805, the CPU 101 instructs the configuration controller 130 to perform the following processing. The configuration controller 130 merges the configuration data for partial reconfiguration portion function 415 read in step S803 and the configuration data for fixed portion logical OR 416 generated in step S804. This merging is similar to the processing (for merging two different pieces of configuration data) described in the processing (3) in step S702 illustrated in FIG. 7. More specifically, as described in the processing (3), this merging acquires such configuration data (bit stream data) in order of columns that changes the contents of the configuration data written in the memory for partial reconfiguration portion 401.

In step S806, the CPU 101 instructs the configuration controller 130 to perform the following processing. The configuration controller 130 performs processing (for transmitting the configuration data acquired by the merging) described in the processing in step S703 illustrated in FIG. 7.

Performing the above-described configuration processing enables saving the memory capacity for the configuration data for common portion 501 which should be stored in the ROM for configuration 150.

Other Exemplary Embodiments

In the above-described exemplary embodiments, the FPGA 140 includes one partial reconfiguration portion, and four different functions A to D are configured in the partial reconfiguration portion. However, the number of partial reconfiguration portions and the number of functions to be configured therein are limited only to make descriptions easy to understand. The number of partial reconfiguration portions and the number of functions to be configured therein are not limited to the numbers in the above-described exemplary embodiments.

In the above-described exemplary embodiments, since the configuration data is used in common, the memory capacity for storing the configuration data can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2014-249423, filed Dec. 9, 2014, which is hereby incorporated by reference herein in its entirety.

What is claimed is:

1. An image processing system comprising:
   a circuit capable of configuring a logical circuit according to configuration data;
   a storage unit configured to store first configuration data for configuring a first logical circuit in a predetermined area on the circuit, and second configuration data for configuring a second logical circuit in the predetermined area; and
   a configuration unit configured to perform first configuration processing for configuring the first logical circuit in the predetermined area, by using the stored first configuration data and predetermined configuration data, on the predetermined area and an area different from the predetermined area, and to perform second configuration processing for configuring the second logical circuit in the predetermined area, by using the stored second configuration data and predetermined configuration data, on the predetermined area and the different area,
   wherein a logical circuit configured in the different area by the first configuration processing and a logical circuit configured in the different area by the second configuration processing are identical, and
   wherein the predetermined configuration data used for the first configuration processing and the predetermined configuration data used for the second configuration processing are not stored in the storage unit in a duplicated way.

2. The image processing system according to claim 1, wherein configuration processing is processing for writing configuration data in the circuit based on a predetermined unit.

3. The image processing system according to claim 2, wherein, in the first configuration processing, the configuration unit merges the first configuration data and the predetermined configuration data based on the predetermined unit, and writes configuration data after the merging in the predetermined area and the different area based on the predetermined unit.

4. The image processing system according to claim 3, wherein, in the first configuration processing, the configuration unit performs the merging based on the predetermined unit and a position in the predetermined area on the circuit.

5. The image processing system according to claim 2, wherein the predetermined unit is one of a column unit, a row unit, and a square area unit.

6. The image processing system according to claim 2, wherein the predetermined unit is a unit covering the predetermined area and the different area.

7. The image processing system according to claim 1, wherein the configuration unit writes the first configuration data in the predetermined area, and writes the predetermined configuration data in the different area, thus performing the configuration processing for configuring the first logical circuit in the predetermined area.

8. The image processing system according to claim 1, wherein the configuration unit writes the second configuration data in the predetermined area, and writes the predetermined configuration data in the different area, thus performing the configuration processing for configuring the second logical circuit in the predetermined area.

9. The image processing system according to claim 1, wherein the storage unit is configured to store the predetermined configuration data used for the first configuration processing, and
wherein the configuration unit performs:
acquiring the stored predetermined configuration data from the storage unit in the first configuration processing; and
acquiring the stored predetermined configuration data from the storage unit in the second configuration processing.

10. The image processing system according to claim 1, wherein the storage unit is configured to store neither the predetermined configuration data used for the first configuration processing nor the predetermined configuration data used for the second configuration processing, and
wherein the configuration unit performs:
in the first configuration processing, generating the predetermined configuration data used for the first configuration processing; and
in the second configuration processing, generating the predetermined configuration data used for the second configuration processing.

11. The image processing system according to claim 10, wherein the configuration unit generates the predetermined configuration data dependent on a position in the predetermined area on the circuit.

12. The image processing system according to claim 1, wherein the predetermined configuration data is used by the configuration unit to perform the first and second configuration processing without changing the logical circuit configured in the different area.

13. The image processing system according to claim 1, wherein the circuit is a FPGA.

14. An image processing apparatus comprising:
a storage unit configured to store first configuration data for configuring a first logical circuit in a predetermined area on a circuit capable of configuring a logical circuit according to configuration data, and to store second configuration data for configuring a second logical circuit in the predetermined area; and
a configuration unit configured to perform first configuration processing for configuring the first logical circuit in the predetermined area, by using the stored first configuration data and predetermined configuration data, on the predetermined area and an area different from the predetermined area, and to perform second configuration processing for configuring the second logical circuit in the predetermined area, by using the stored second configuration data and predetermined configuration data, on the predetermined area and the different area,
wherein a logical circuit configured in the different area by the first configuration processing and a logical circuit configured in the different area by the second configuration processing are identical, and
wherein the predetermined configuration data used in the first configuration processing and the predetermined configuration data used in the second configuration processing are not stored in the storage unit in a duplicated way.

* * * * *